US009366861B1

(12) United States Patent
Johnson

(10) Patent No.: US 9,366,861 B1
(45) Date of Patent: Jun. 14, 2016

(54) LASER PARTICLE PROJECTION SYSTEM

(71) Applicant: Randy E. Johnson, Escondido, CA (US)

(72) Inventor: Randy E. Johnson, Escondido, CA (US)

(*) Notice: Subject to any disclaimer, the term of this patent is extended or adjusted under 35 U.S.C. 154(b) by 0 days.

(21) Appl. No.: 14/062,997

(22) Filed: Oct. 25, 2013

Related U.S. Application Data

(63) Continuation-in-part of application No. 13/409,069, filed on Feb. 29, 2012, now abandoned.

(51) Int. Cl.
G02B 27/20 (2006.01)
G02B 26/12 (2006.01)
G02B 13/00 (2006.01)
G02B 27/18 (2006.01)

(52) U.S. Cl.
CPC .......... *G02B 26/125* (2013.01); *G02B 13/0005* (2013.01); *G02B 27/18* (2013.01)

(58) Field of Classification Search
CPC ........................................................ G02B 27/18
USPC ........................................... 362/259; 348/344
See application file for complete search history.

(56) References Cited

U.S. PATENT DOCUMENTS

| 4,001,840 | A  | * | 1/1977  | Becker et al. ............... 347/259 |
| 6,034,804 | A  | * | 3/2000  | Bashkansky et al. ....... 359/201.1 |
| 6,452,132 | B1 | * | 9/2002  | Fuse ........................... 219/121.7 |
| 6,606,180 | B2 | * | 8/2003  | Harada ....................... 359/204.4 |
| 6,685,868 | B2 | * | 2/2004  | Costin .......................... 264/400 |
| 6,850,350 | B2 | * | 2/2005  | Kawabata et al. .......... 359/205.1 |
| 8,294,062 | B2 | * | 10/2012 | Sukhman et al. ........ 219/121.74 |
| 2002/0180869 | A1 | * | 12/2002 | Callison et al. ............... 348/203 |
| 2004/0197490 | A1 | * | 10/2004 | Rieck ............................ 427/553 |
| 2004/0201856 | A1 | * | 10/2004 | Quadling et al. ............. 356/601 |
| 2006/0039056 | A1 | * | 2/2006  | Lee .............................. 359/212 |
| 2010/0110389 | A1 | * | 5/2010  | Liao et al. ...................... 353/31 |
| 2011/0187025 | A1 | * | 8/2011  | Costin, Sr. .................... 264/400 |

* cited by examiner

*Primary Examiner* — Rodney Fuller
(74) *Attorney, Agent, or Firm* — Charmasson, Buchaca & Leach, LLP

(57) ABSTRACT

An improved particle effect projector is disclosed that reduces the energy density of a laser beam projected through a movie theater or other entertainment venue, comprising an F-theta lens, a beam expander and a beam focuser with a long focal length that approximates the distance between the particle effect projector and the movie screen or other surface onto which the particle effect beam is being projected.

5 Claims, 4 Drawing Sheets

LASER PARTICLE PROJECTION SYSTEM

CROSS-REFERENCE TO RELATED APPLICATIONS

This application is a continuation-in-part of co-pending U.S. application Ser. No. 13/409,069, filed Feb. 29, 2012, which is hereby incorporated by reference in its entirety.

BACKGROUND OF THE INVENTION

The present invention pertains generally to the field of light projection systems, such as those used in movie theaters or other entertainment venues. More particularly, the present invention is directed to an apparatus for projecting a light, such as a laser light, onto a movie screen or other surface. The arrangement of lenses in the apparatus produces a beam that has a low energy density over most of the beam's distance, thereby reducing the risk of harm to a person sitting in the theater or venue.

In recent years, laser particle effect systems have been developed that enable a laser light to be used to simulate the appearance of certain effects that are difficult to reproduce with conventional video techniques, or that otherwise lend themselves to reproduction with lasers. Examples of such effects include visual effects like geometric patterns or writing on a surface, and abstract effects like glowing trails, magic spells, sparks, fizzing bubbles, pixie dust or the like.

The effects are created by rapidly moving a laser beam to create a desired pattern, or to create discrete dots of laser light, on a surface or projection screen or on multiple surfaces. The laser is rapidly cycled or interrupted to simulate a plurality of individual particles on the target surface. A plurality of different colored lasers may also be used in coordinated fashion to create multi-colored effects.

The laser particle effect may be overlaid onto, or otherwise coordinated with, a video that is projected onto the movie screen or other surface. To give the particle effect a three-dimensional characteristic, a mesh or "scrim" may be suspended in the path of the projection, onto which the particle effect is being projected. The mesh or scrim is normally not visible to the viewing patrons sitting in the audience, but will reflect the light that is being projected onto the mesh. A three dimensional effect can also be generated by placing other physical objects in front of or behind the plane of the primary screen, and shining the laser light onto those physical objects.

As an example, a movie theater will normally have a projector for projecting a film or video onto a projection screen. The projector is typically located in a projection room at the back of the theater, behind and above the seating area where the movie theater's customers sit while watching a movie. The projection screen is located at the other end of the theater, in front of the audience, with the audience sitting in chairs between the projection room and the projection screen.

A laser particle effect could be used in conjunction with advertisements shown before the main feature film. For example, an advertisement for a cola drink might include video showing the cola being poured into a glass, while a laser-based particle effect is superimposed over the video image that appears on the movie screen, to simulate fizzy bubbles coming off of the soda as it is poured into the glass. Particle effects can also be coordinated with and overlaid onto the video for a feature film, as part of the overall movie production.

Particle effect systems typically use a coherent light source, such as a laser light, to provide the particle effect. The advantage of using a coherent light source, such as a laser, is that the particle effect is made up of small, bright laser dots shining onto the viewing surface, making the effect brighter, more distinct and more vivid than if a non-coherent light source had been used.

However, there is a distinct disadvantage to using coherent light, such as laser light, to generate a particle effect in a crowded venue, such as a movie theater. Laser light typically has a high energy density. In crowded venues, there is always a risk that a person might position their body directly in the path of the laser beam, which can cause damage to the person's skin. Or, they might turn around and inadvertently look directly at the laser light, which can damage their eyes.

Because even relatively small amounts of laser light can lead to permanent eye injuries, the usage of lasers is typically subject to government regulations. To control the risk of injury, various specifications, for example ANSI Z136 in the US and IEC 60825 internationally, define "classes" of lasers, depending on their power and wavelength.

The maximum permissible exposure (MPE) is the highest power or energy density (in $W/cm^2$ or $J/cm^2$) of a light source that is considered safe. The MPE is measured at the cornea of the human eye or at the skin, for a given wavelength and exposure time. A calculation of the MPE for ocular exposure takes into account the various ways light can act upon the eye. In addition to the wavelength and exposure time, the MPE takes into account the spatial distribution of the light (from a laser or otherwise). Collimated laser beams of visible and near-infrared light are especially dangerous at relatively low powers because the lens focuses the light onto a tiny spot on the retina. Light sources with a smaller degree of spatial coherence than a well-collimated laser beam, such as high-power LEDs, lead to a distribution of the light over a larger area on the retina. For such sources, the MPE is higher than for collimated laser beams. In the MPE calculation, the worst-case scenario is assumed, in which the eye lens focuses the light into the smallest possible spot size on the retina for the particular wavelength and the pupil is fully open. Although the MPE is specified as power or energy per unit surface, it is based on the power or energy that can pass through a fully open pupil (0.39 $cm^2$) for visible and near-infrared wavelengths. This is relevant for laser beams that have a cross-section smaller than 0.39 $cm^2$. The IEC-60825-1 and ANSI Z136.1 standards include methods of calculating MPEs.

A Class 1 laser is safe under all conditions of normal use. This means that the maximum permissible exposure (MPE) cannot be exceeded when viewing a laser with the naked eye or with the aid of typical magnifying optics (e.g. telescope or microscope). To verify compliance, the standard specifies the aperture and distance corresponding to the naked eye, a typical telescope viewing a collimated beam, and a typical microscope viewing a divergent beam. It is important to realize that certain lasers classified as Class 1 may still pose a hazard when viewed with a telescope or microscope of sufficiently large aperture. For example, a high-power laser with a very large collimated beam or very highly divergent beam may be classified as Class 1 if the power that passes through the apertures defined in the standard is less than the MPE for Class 1; however, an unsafe power level may be collected by a magnifying optic with larger aperture.

A Class 1M laser is safe for all conditions of use except when passed through magnifying optics such as microscopes and telescopes. Class 1M lasers produce large-diameter beams, or beams that are divergent. The MPE for a Class 1M laser cannot normally be exceeded unless focusing or imaging optics are used to narrow the beam. If the beam is refocused, the hazard of Class 1M lasers may be increased and the product class may be changed. A laser can be classified as Class 1M if the power that can pass through the pupil of the naked eye is less than the MPE for Class 1, but the power that can be collected into the eye by typical magnifying optics (as defined in the standard) is higher than the MPE for Class 1 and lower than the MPE for Class 3B.

A Class 2 laser is safe because the blink reflex will limit the exposure to no more than 0.25 seconds. It only applies to visible-light lasers (400-700 nm). Class-2 lasers are limited to 1 mW continuous wave, or more if the emission time is less than 0.25 seconds or if the light is not spatially coherent. Intentional suppression of the blink reflex could lead to eye injury. Many laser pointers and measuring instruments are class 2.

A Class 2M laser is safe because of the blink reflex if not viewed through optical instruments. As with class 1M, this applies to laser beams with a large diameter or large divergence, for which the amount of light passing through the pupil cannot exceed the limits for class 2.

A Class 3R laser is considered safe if handled carefully, with restricted beam viewing. With a class 3R laser, the MPE can be exceeded, but with a low risk of injury. Visible continuous lasers in Class 3R are limited to 5 mW. For other wavelengths and for pulsed lasers, other limits apply.

A Class 3B laser is hazardous if the eye is exposed directly, but diffuse reflections such as those from paper or other matte surfaces are not harmful. The MPE for continuous lasers in the wavelength range from 315 nm to far infrared is 0.5 W. For pulsed lasers between 400 and 700 nm, the limit is 30 mJ. Other limits apply to other wavelengths and to ultrashort pulsed lasers. Protective eyewear is typically required where direct viewing of a class 3B laser beam may occur. Class-3B lasers must be equipped with a key switch and a safety interlock. Class 3B lasers are used inside CD and DVD writers, although the writer unit itself is class 1 because the laser light cannot leave the unit.

Class 4 is the highest and most dangerous class of laser, including all lasers that exceed the Class 3B MPE. By definition, a class 4 laser can burn the skin, or cause devastating and permanent eye damage as a result of direct, diffuse or indirect beam viewing.

Most laser-based particle effect systems use Class 3B lasers, which normally require protective eyewear where direct viewing of a class 3B laser beam may occur. Consequently, current laser-based particle effect systems normally depend on placing the lasers in location that will negate the possibility of a person directly viewing the laser. This usually involves mounting the laser or lasers onto the ceiling in a theater or other entertainment venue, and shining the laser downward onto the movie screen or wall at a very steep angle. This precludes the use of a laser-based particle effect system that is located in the projection room at a back of theater. This can also make it more difficult to produce a video or film with coordinated, pre-planned, associated laser light effects, particularly where 3D effects are involved, because the producer of the coordinated media cannot know in advance that the video and particle effects will be projected from the same location.

In view of the foregoing disadvantages of existing particle effect systems, there is a need for an improved light projection apparatus that is capable of being positioned alongside, or incorporated into, a video projector. In a movie theater, the light projection apparatus could be positioned inside the projection room at the back of the theater. Because the light from the light projection apparatus (typically a laser light) would be shined over the audience sitting in the theater, there is a need for such an improved light projection system that projects a light with an energy density that is low enough to comply with the above-described regulations, to avoid potential harm to patrons in the audience. At the same time, there is a need for such an improved particle effect apparatus that will provide bright, distinct and vivid laser dots shining onto the movie screen or other viewing surface.

SUMMARY OF THE INVENTION

These and other objects are met by the present invention. In a basic aspect, the present invention is an improved apparatus for projecting a light beam onto a surface, which comprises a light source that emits a beam of light. The light source is preferably a laser light source.

An optical beam expander lens element is positioned in the path of the beam to expand the width of the light beam, thereby reducing the energy density of the beam. Another refocusing lens element is positioned in the path of the light that exits the beam expander, being adapted to refocus the expanded beam. The refocusing lens assembly has a long focal length, more than at least about 5 meters, such that the light beam is substantially focused at the distance of the movie screen or other surface against which the light beam is projected, designated as "d" in FIG. 1.

If a laser beam focused by an ordinary lens is deflected in the beam path behind the lens, the image produced takes the form of a circular arc. Movie screens are typically flat. If the light beam is being projected against a flat screen or other surface, this can result in distortion of the image toward the outer edges of the screen. Thus, in a preferred embodiment, the apparatus comprises a first lens assembly that is positioned between the light source and the beam expander, wherein the first lens assembly is a flat field lens with a focal plane that is a flat surface.

In a particularly preferred embodiment, the first lens assembly is an F-theta lens. The F-theta lens design is optimized for a flat field in the image plane. In an F-theta lens, the output beam displacement is equal to $f(\theta)$, where $\theta$ is the angle of incidence of the input beam, measured along an axis through the lens. Thus, the input beam angular velocity is directly proportional to the output beam angular velocity. The use of such a lens also has another advantage, in that, as discussed below, it allows the unit to use smaller deflections of the beam directing mirrors to create the required deflection of the beam through the various lens elements of the system and then onto the movie screen.

Each of the above-described lens assemblies can include multiple lenses to create the desired effect. The lenses can also be formed as separate lens assemblies or can be combined into one or more combined lenses or lens assemblies that will perform the functions of each of the first, lens assembly (the flat field lens with a focal plane that is a flat surface), the second lens assembly (the beam expander lens assembly) and the third lens assembly (the refocusing lens assembly with a long focal length). The apparatus can also include mechanisms for adjusting the relative positions of the lights source and the various lens components with respect to each other.

DETAILED DESCRIPTION OF THE INVENTION

The present invention can be used in a variety of different indoor or outdoor entertainment venues or other venues where it is necessary or desirable to project a light beam against one or more surfaces.

Figure 1:
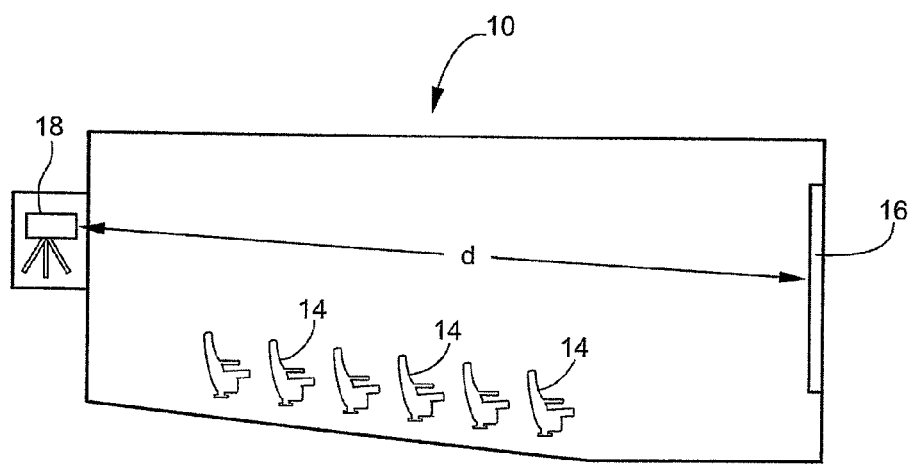
FIG. 1 is a view of a typical movie theater, taken from the side.

The system is described below in the context of an exemplary application in a typical movie theater 10, shown in FIG. 1. A movie or video projector (not shown) positioned in a projection room 12 at the back of the theater, viewed from the side in FIG. 1. A plurality of seats 14 provide seating for the members of the audience. A movie screen 16 is located at the other end of the theater 10.

A particle effect projector 18 in accordance with the present invention is positioned alongside the video projector. Alternatively, the particle effect projector 18 can be incorporated into the housing of the video projector. For ease of reference, the particle effect projector 18 is described herein as a stand-alone unit, although it will normally be connected to and synchronized with the video projector by a microprocessor.

Figure 2:
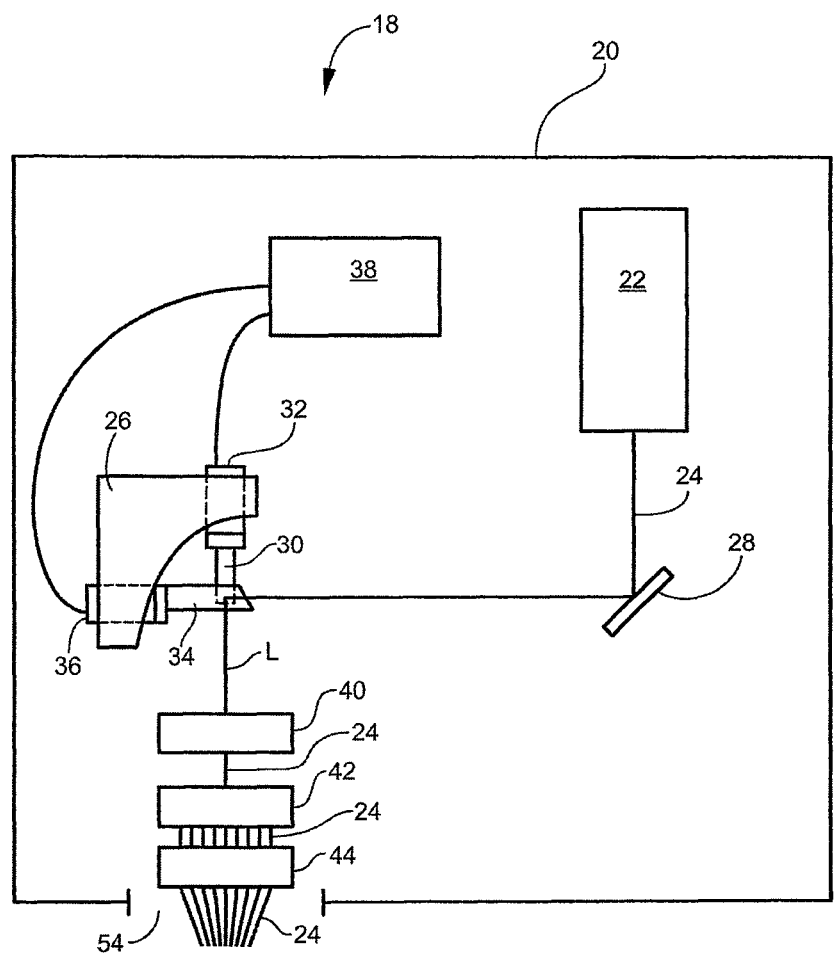
FIG. 2 is a block schematic drawing showing the arrangement of the various elements in an embodiment of the invention.

FIG. 2 shows a stand-alone particle effect projector 18 in accordance with the present invention. The projector will normally have a housing 20 and a stand (not shown) for supporting the housing in an elevated position alongside the video projector 10. The particle effect projector 18 is positioned a distance "d" from the movie screen 16. For purposes of describing the system, it is assumed that the video projector is also the same distance "d" from the movie screen, although the video projector can be a different distance from the movie screen.

Within the housing 20, there is at least one laser 22, and preferably a plurality of lasers 22, with each laser generating a beam 24 of a different color of laser light (typically red, blue or green). The one or more lasers are positioned adjacent to the lens assemblies. In an exemplary embodiment, the laser source is a BLISSLIGHTS Model BLPPRGB1.5W Particle Projector, with red, blue and green lasers having wavelengths of 637 (+/−5) nm, 532.5 (+/−0.5) nm and 443 (+/−3) nm, respectively, and with each laser having an output powers of approximately 300 mW. For ease of reference, only one laser beam is shown in the Figures.

Light from each laser is directed into a scanner 26 from one or more mirrors 28. The scanner 26 controls the direction of the laser beam(s) 24. The scanner unit 26 is typically a dual mirror galvanometer system used as a beam positioning or beam steering element with a closed loop servo-control system.

As shown in FIG. 2, the scanner unit 26 preferably includes a first servo controlled mirror 30, oriented across the path of each light beam 24, with a mirror that extends directly out of a first galvanometric servo 32 and is mounted onto the end of the axis of the first servo. Each light beam 24 intersects the first servo-controlled mirror, which reflects the light beam into a second servo-controlled mirror 34 that is mounted onto the end of the axis of a second servo 36.

The relative positions of the first and second mirrors 30 and 34 are controlled by a microprocessor-based control board 38, to which the servos are connected. By controlling the relative positions of the first and second mirrors 30 and 34, the direction of each laser beam can be carefully controlled and varied in an x-y coordinate system. Each mirror assembly in a dual axis galvanometric optical scanner consists of a galvanometer-based scanning motor with an optical mirror mounted on the shaft and a detector that provides positional feedback to the control board.

Due to the large angular acceleration of the rotation shaft, the size, shape and inertia of the mirrors become significant factors in the design of high performance galvanometer systems. To deflect the mirror through, for example, a 40-degree movement takes substantially longer and introduces more error and distortion into the system than a smaller movement of, for example, 10 degrees.

The beam 24 that exits the scanner 26 is directed along an axis "L". In a preferred embodiment, the beam 24 enters a first lens assembly, a flat field lens with a focal plane that is a flat surface. The first lens assembly is preferably and F-Theta lens. Such a lens reduces the angular deflection that is required from the two mirrors in the dual-axis galvanometic optical scanner, which reduces the distortion of the beam and increases the accuracy and intensity of the beam. The specifications of the F-Theta lens will depend on the specific geometry of the environment in which the system is being used. It can be, for example, a lens having a 100 mm focal length.

Figure 3:
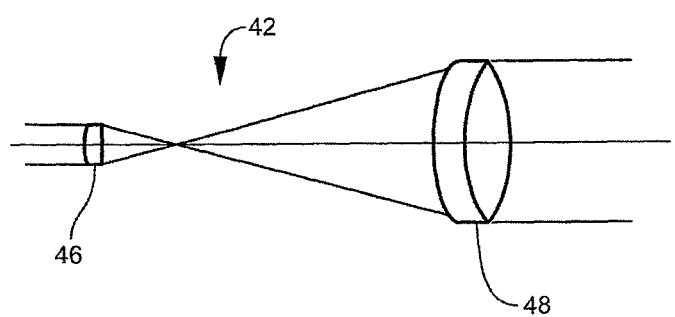
FIG. 3 is a side view of a beam expander lens element in accordance with an embodiment of the invention.
Figure 4:
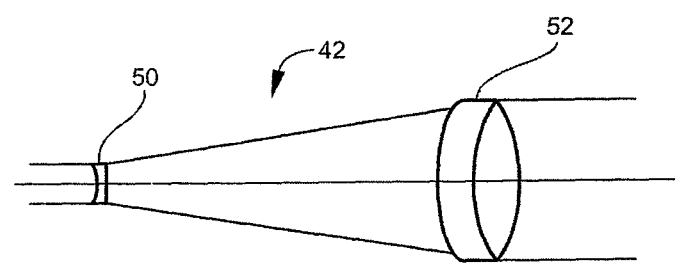
FIG. 4 is a side view of an alternative approach for a beam expender lens element in accordance with an embodiment of the invention.

The output from the F-theta lens 40 enters a second lens assembly 42, shown in FIGS. 2 and 3, which can be broadly referred to as a beam expander. The beam expanding aspect of the projector 18 can function in the reverse manner of a lensed telescope. As with telescopes, there are two basic ways of implementing beam expansion systems: (1) the Kepler arrangement consisting of two positive lenses or groups of lenses (lens elements 46 and 48 shown in FIG. 3); and (2) the Galileo configuration with a negative and a positive subsystem (lens elements 50 and 52 as shown in FIG. 4). The beam expander will typically include a large numerical aperture lens to expand the beam and to lower the beam's energy density. A collimator can be provided to cause the waves or particles of the beam to become more aligned in a specific direction.

The laser beam expander 42 is designed to increase the diameter of a collimated input beam to a larger collimated output beam. Beam expanders have been used in applications such as laser scanning, interferometry, and remote sensing. Contemporary laser beam expander designs are focal systems that developed from optical telescope fundamentals. In such systems, the object rays, located at infinity, enter parallel to the optical axis of the internal optics and exit parallel to them as well. This means that there is no focal length to the entire system.

The beam expander assembly 42 expands and collimates the beam 24, to form a beam with a safe and reduced energy density. However, that beam must then be refocused over a relatively long distance "d", the distance from the projector to the movie screen, which will be more than about 5 meters, usually in excess of about 20 meters, and preferably in excess of about 33 meters in most entertainment venues, to form a bright, distinct dot on the movie screen or other surface onto which the beam is being projected.

Figure 5:
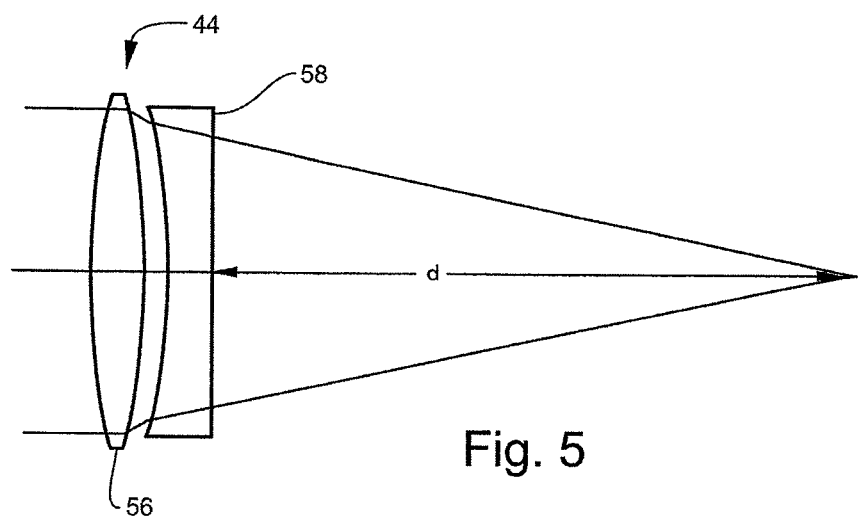
FIG. 5 is a side view of a re-focusing lens assembly in accordance with an embodiment of the invention.
Figure 6:
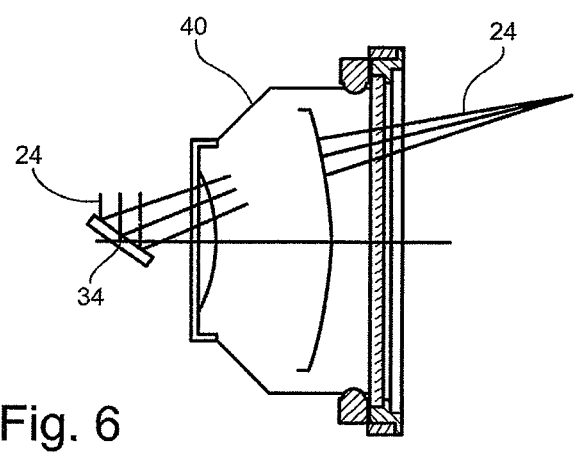
FIG. 6 is a side view of an F-Theta lens assembly in accordance with an embodiment of the invention.

Therefore, the beam is introduced into a third lens assembly 44, shown in FIG. 5, which refocuses the expanded beam over the distance between the projector 18 and the screen 16. The third lens assembly 44 can include two lenses 56 and 58, with the lens 56 having two convex sides and the lens 58 having a concave side and a flat side. The third lens assembly 44 should have a focal length that is approximately the same as the distance (d) between the projector 18 and the movie screen 16. The refocused beam exits the housing through an opening 54 in the housing. The refocused beam is within safe MPE levels over the majority of the distance (d) and at all locations where viewers might be seated.

Various adjustment mechanisms (not shown) can be included as parts of the apparatus, to allow the relative positions of the various lenses and lens elements to be adjusted and focused.

Where multiple different colored lasers are used, each beam will have a different wavelength. For example, a red laser might emit at 635 nm, a green laser might emit at 532 nm and a blue laser might emit at 445. Because the lasers are emitting light at different wavelengths, there can be distortion that is created in the various lenses and that appears on the movie screen. To address such distortion, an achromatic color corrector can be included as part of the system. Achromatic lenses are used to minimize or eliminate chromatic aberration. The achromatic design also helps minimize spherical aberrations.

In a particularly preferred embodiment, the system includes correcting lens elements to change the aspect ratio of the projection system to whatever aspect ratio (e.g., 16:9) is used for the movie projector. This allows for simple coordination between the particle effect projection system and the movie projector that is projecting the movie onto which the particle effects are overlaid.

The preceding description has been presented only to illustrate and describe exemplary embodiments of the methods and device of the provided disclosure. It is not intended to be exhaustive or to limit the disclosure to any precise form. It will be understood by those skilled in the art that various changes may be made and equivalents may be substituted for elements thereof without departing from the scope of the disclosure.

In addition, many modifications may be made to adapt a particular situation or material to the teachings of the disclosure without departing from the essential scope. Therefore, it is intended that the disclosure not be limited to the particular embodiment discussed as the best mode contemplated for carrying out the teaching of the disclosure, but that the teaching will include all embodiments falling within the scope of the claims. The disclosure may be practiced otherwise than is specifically explained and illustrated without departing from its spirit or scope. The scope of the disclosure is limited solely by the following claims.

What is claimed is:

1. A method of using a particle effect projection apparatus to safely project a laser light beam onto a surface a distance away from the apparatus, over the heads of an audience, comprising:
   (a) providing a housing located alongside a movie projector;
   (b) providing a laser light source within the housing that emits a beam of coherent light;
   (c) providing a first lens assembly positioned in the path of the beam of coherent light, the first lens assembly comprising a flat field lens having a focal plane that is a flat surface;
   (d) providing for the direction of the beam of coherent light to be controlled by a dual-mirror galvanometric scanner, before the beam enters the first lens assembly;
   (e) providing a second lens assembly positioned in the path of the light beam that exits the first lens assembly, the second lens assembly comprising a beam expander that is adapted to expand the light beam, thereby reducing the energy density of the light beam;
   (f) providing a third lens assembly positioned in the path of the light beam that exits the second lens assembly, the third lens assembly being adapted to refocus the beam and having a focal length such that the light beam will be substantially focused on the surface against which the light beam is to be projected; and
   (g) providing a microprocessor for controlling the motion of the duel-mirror galvanometric scanner, to coordinate and synchronize the movement of the beam with a series of images projected onto the surface by the movie projector; wherein the re-focused beam that exits the housing is within safe MPE levels at all locations where viewers could be seated in the audience and beyond safe MPE levels on the surface against which the light beam is to be projected.

2. The method of claim 1, wherein the first lens assembly is an F-theta lens.

3. The method of claim 1, wherein the third lens assembly has a focal length of more than about 5 meters.

4. The method of claim 1, wherein the laser light source comprises a red laser, a green laser and a blue laser.

5. The method of claim 4, wherein the third lens assembly has a focal length of more than about 5 meters.

* * * * *